3,211,760
PROCESS FOR THE MANUFACTURE OF 19-NOR-STEROIDS

Oskar Jeger and Kurt Schaffner, Zurich, Switzerland, assignors to Ciba Corporation, New York, N.Y., a corporation of Delaware
No Drawing. Filed May 7, 1963, Ser. No. 278,775
Claims priority, application Switzerland, May 11, 1962, 5,736/62
19 Claims. (Cl. 260—397.3)

The present invention provides a new process for the manufacture of 10-unsubstituted 19-norsteroids from steriods that contain an esterified hydroxyl group in position 10.

19-norsteroids, more especially derivatives of 19-nortestosterone and of 19-norprogesterone, have become very important in recent years as anabolic and gestagenic medicaments and as ovulation inhibitors.

The 19-norsteroids have hitherto been accessible in a simple manner only by reduction of steroids containing an aromatic ring A which themselves had to be prepared from unsaturated 3-ketosteroids by thermal elimination of the angular $C_{19}$ methyl group and simultaneous aromatisation. Since, by the processes described in U.S. patent application, Serial No. 222,168, filed September 7, 1962 by Albert Wettstein et al., U.S. Patent No. 3,067,198, patented December 4, 1962, to Albert Wettstein et al., and U.S. Patent No. 3,077,482, patented February 12, 1963, to Albert Wettstein et al., it is now possible to manufacture in a simple manner $\Delta^4$-3-oxo-19-hydroxy-steroids from $\Delta^5$-3-hydroxysteroids, processes for the manufacture of 19-norsteroids by elimination of the angular substituent in these compounds have become very important. Our copending patent application Serial No. 278,777, filed May 7, 1963 describes a process for the conversion of $\Delta^4$- and $\Delta^{4,6}$-3-oxo-19-hydroxy-steroids into 10-acyloxy-$\Delta^4$-3-oxo-9-norsteroids and their 6-dehydro derivatives. According to said process a lead tetraacylate is reacted upon $\Delta^4$-3-oxo-19-hydroxy-steroids.

The present invention provides a process for the manufacture of 10-unsubstituted 19-norsteroids, wherein $\Delta^4$-3-oxo-19-norsteroids containing in position 10 an acyloxy group are treated with a reducing agent, whereupon, if desired, a resulting $\Delta^{5(10)}$-3-oxo-19-norsteroid is converted into a $\Delta^4$-3-oxo-19-norsteroid.

The starting materials used in the present process belong preferably to the spirostane, androstane, pregnane, cholane, cholestane, stigmastane or cardanolide series and may contain in the ring system, more especially in one or more than one of positions 1, 2, 6, 7, 8, 9, 11, 12, 14–17, 20 and 21, further substituents such as free or functionally converted oxo groups, esterified or etherified hydroxyl groups, alkyl (for example, methyl) groups and/or halogen atoms. Suitable functionally converted oxo groups are ketalized oxo groups or such as have been converted into enol derivatives, for example enolethers or enolesters. Furthermore, the starting materials may contain additional double bonds, especially in position 6 or oxido groups, for example, in position 9:11 or 16:17.

Particularly valuable starting materials are 10-acyloxy-19-nor-$\Delta^4$-3-ketones of the androstane, pregnane or spirostane series, for example:

$\Delta^4$-3:17-dioxo-10-acetoxy-19-norandrostene,
$\Delta^4$-3-oxo-10-acetoxy-17$\beta$-hydroxy-19-norandrostene and its esters,
$\Delta^4$-3-oxo-10-acetoxy-17$\beta$-hydroxy-17$\alpha$-alkyl-, -alkenyl- or -alkinyl-19-norandrostenes, for example -17$\alpha$-methyl-, -ethyl-, -allyl-, -vinyl-, isobutyl-, ethinyl- or -(2-methyl)-ethinyl-19-norandrostene.

Furthermore there may be mentioned:

$\Delta^4$-3:20-dioxo-10-acetoxy-19-norpregnene,
$\Delta^4$-3:20-dioxo-10:17$\alpha$-diacetoxy-19-norpregnene,
$\Delta^4$-3-oxo-10-acetoxy-19-norspirostene, and the 6-dehydro derivatives thereof, such as
$\Delta^{4,6}$-3:17-dioxo-10$\beta$-acetoxy-19-norandrostadiene or
$\Delta^{4,6}$-3:20-dioxo-10$\beta$:17$\alpha$-diacetoxy-19-norpregnadiene.

For the reduction according to the invention there are particularly suitable metallic reducing agents, more especially those which are capable of removing the 10-substituent by reduction and at the same time converting the $\Delta^4$-3-oxo grouping into a $\Delta^{3,5(10)}$-enolate; that is to say that there are primarily suitable metals of groups I and II of the Periodic System, if desired in combination with hydrogen donors, for example, alkali or alkaline earth metals such as sodium, potassium, lithium or calcium, preferably dissolved in liquid ammonia or in an amine such as ethylamine, isopropylamine, ethylenediamine and the like, if desired with addition of a diluent such as ether, tetrahydrofuran or dioxane. Of special importance to industry is the reduction with zinc or a zinc alloy, such as zinc-copper or amalgamated zinc, whereupon zinc enolates are formed. For the reductive elimination of the 10-acyloxy group also heavy metal salts having a reducing action can be used, for example, chromium (II), copper (I) or cobalt (II) salts in a useful solvent, preferably an ether, such as diethyl ether or tetrahydrofuran or a lower aliphatic acid, such as acetic propionic or butyric acid, optionally in admixture with water. Preferred methods are, for example, a short treatment of the acetic acid solution containing the 10-acyloxy compounds with a stoichiometric or excessive amount of chromium (II) chloride solution in aqueous acetic acid-hydrochloric acid, or the treatment of an ethereal solution of the 10-acyloxy compounds with a solution containing an alkyl magnesium halide and, for example, a copper (II) acylate in dioxane-ether, whereby the copper (II) salt is converted into the copper (I) salt. It is advantageous to use the reduction method with heavy metal acylates for the elimination of 10-acyloxy groups in $\Delta^{4,6}$-3-oxo-steroids, since according to the reduction with zinc one double bond is partially hydrogenated to form a $\Delta^5$-3-oxo-grouping. When the solvent used for the reduction with zinc is a neutral compound, for example an alcohol such as methanol, ethanol, isopropanol or a carboxylic acid anhydride, such as acetic anhydride, propionic anhydride or the like, there are obtained after conventional working up predominantly $\Delta^{5(10)}$-3-oxo-19-norsteroids which, if desired, can be rearranged by treatment with a base (such as a hydroxide, alcoholate, carbonate or bicarbonate of an alkali metal, or an organic base such as diethylamine, triethylamine, benzyl trimethyl ammonium hydroxide or by means of an alkaline earth metal hydroxide or alumina) to $\Delta^4$-3-oxo-19-norsteroids. The same rearrangements can alternatively be performed with acidic agents, such as mineral, sulfonic or carboxylic acids, that is to say, for example, with hydrochloric, sulfuric, para-toluenesulfonic, acetic, propionic or oxalic acid, if desired in a diluent, such as an alcohol, for example methanol, ethanol, butanol, tertiary butanol or a halogenated hydrocarbon such as methylene chloride or chloroform, or in aqueous dioxane or tetrahydrofuran. $\Delta^{5(10)}$-3-oxo-19-norsteroids are also obtained when the reduction with active zinc is carried out in a suitable solvent free from hydroxyl, such as toluene or xylene, or by reduction in aqueous pyridine. On the other hand, when the reduction with zinc is performed in an acidic medium, for example in a lower aliphatic carboxylic acid such as acetic or propionic acid, if desired with addition of water or an alcohol, the $\Delta^4$-3-oxo-19-norsteroids are obtained directly.

The following examples illustrate the invention.

*Example 1*

100 mg. of $\Delta^4$-3:17-dioxo-10-acetoxy-19-norandrostene are dissolved in 100 cc. of acetic anhydride, 200 mg. of zinc dust are added and the whole is stirred and heated at the boil for 8 minutes. The mixture is then cooled, filtered and the filtrate is evaporated to dryness in a water-jet vacuum; the residue is taken up in ether, and the solution is washed with water. The ethereal solution is dried and evaporated to yield a crystalline residue which contains as main product $\Delta^{5(10)}$-3:17-dioxo-19-norandrostene [melting at 140–142° C.; optical rotation $[\alpha]_D^{25}=+260°$ (c.=1.0)] and in addition a small amount of unreacted starting material.

*Example 2*

A solution of 500 mg. of $\Delta^4$-3:20-dioxo-10-acetoxy-19-norpregnene in 100 cc. of glacial acetic acid is mixed with 5.0 grams of zinc dust and the whole is heated and vigorously stirred for 30 minutes at 80° C. The reaction mixture is then cooled, filtered, the residue is washed with benzene, and the filtrate is evaporated to dryness in a water-jet vacuum. The residue is taken up in methylene chloride, the solution is washed with dilute sodium bicarbonate solution and with water, dried and evaporated. The residue (486 mg.) yields on crystallization from methylene chloride+hexane 375 mg. of 19-norprogesterone melting at 142–144° C. Optical rotation $$[\alpha]_D^{25}=+148° \ (c.=1.02)$$

*Example 3*

A solution of 300 mg. of $\Delta^4$-3-oxo-10-acetoxy-17$\beta$-decanoyloxyandrostene in 90 cc. of glacial acetic acid is mixed with 3.0 grams of zinc dust and 0.9 cc. of water and heated with vigorous stirring for 40 minutes at 90° C. The mixture is filtered after cooling, the residue is washed with methylene chloride and the filtrate is evaporated in a water-jet vacuum. The residue is taken up in benzene, washed with dilute sodium bicarbonate solution and with water, dried and once more evaporated in a water-jet vacuum. The residue is dissolved in benzene and chromatographed on alumina. A 1:1-mixture of benzene and ether elutes 210 mg. of 19-nortestosterone decanoate which melts at 38° C. after crystallization from pentane at −10° C.

*Example 4*

A mixture of 100 mg. of $\Delta^4$-3:17-dioxo-10-acetoxy-19-norandrostene, 6 cc. of glacial acetic acid and 200 mg. of zinc dust is stirred and refluxed for 30 minutes. After cooling, the reaction mixture is filtered and diluted with methylene chloride, washed with water, dilute sodium bicarbonate solution and with water, dried and evaporated to dryness. Crystallization from methylene chloride+ether yields 85 mg. of $\Delta^4$-3:17-dioxo-19-norandrostene melting at 164–165° C.

*Example 5*

A solution of 750 mg. of $\Delta^4$-3:20-dioxo-10:17$\alpha$-diacetoxy-19-norpregnene in 50 cc. of glacial acetic acid is heated to 100° C. with stirring. 2.0 grams of zinc dust are then added in small portions, the batch is stirred for 30 minutes at 100° C., cooled and filtered. The filtrate is evaporated to dryness, the residue is dissolved in benzene, and the solution is washed with dilute sodium bicarbonate solution and then with water, dried and evaporated in a water-jet vacuum. Crystallization from methylene chloride+ether yields 485 mg. of $\Delta^4$-3:20-dioxo-17$\alpha$-acetoxy-19-norpregnene melting at 222–223° C.

*Example 6*

1.0 gram of $\Delta^{4,6}$-3:20-dioxo-10$\beta$:17$\alpha$-diacetoxy-19-norpregnadiene is dissolved in 20 cc. of glacial acetic acid and, while passing over carbon dioxide, 17.0 cc. of an 0.335 molar chromium (II) chloride solution are added (the latter is prepared by reduction of a solution containing 10.8 grams of chromium (III) chloride, 24 cc. of water and 16 cc. of concentrated hydrochloric acid with 10 g. of freshly amalgamated zinc wool). After keeping the reaction mixture 2 minutes at 20° C., it is diluted with water, extracted with chloroform, the organic phase is washed with water until neutral, dried and evaporated in a water-jet vacuum. There are obtained 890 mg. of a mixture which, according to the infrared spectrum, contains about 75% of $\Delta^{5(10),6}$-3:20-dioxo-17$\alpha$-acetoxy-19-norpregnadiene and 25% of $\Delta^{4,6}$-3:20-dioxo-17$\alpha$-acetoxy-19-norpregnadiene. The mixture can either be split into its components by chromatography on silica gel (50 times the amount of steroids, elutriant benzene and benzene-ethylacetate) or transformed into the pure $\Delta^{4,6}$-3:20-dioxo-17$\alpha$-acetoxy-19-nor-pregnadiene, melting at 232–234° C., $[\alpha]_D^{25}=-58°$ (c.=1), by heating it for 15 minutes in glacial acetic acid under reflux; yield 85%.

*Example 7*

According to the method described in Example 6 1.0 gram of $\Delta^{4,6}$-3:17-dioxo-10$\beta$-acetoxy-19-norandrostadiene yields 705 milligrams of pure $\Delta^{4,6}$-3:17-dioxo-19-norandrostadiene melting at 180–182° C.

In an analogous manner 1.0 gram of $\Delta^4$-3:17-dioxo-10$\beta$-acetoxy-19-norandrostene yields, after the isomerization of the primarily formed $\Delta^{5(10)}$-3:17-dioxo-19-norandrostene, 810 milligrams of $\Delta^4$-3:17-dioxo-19-norandrostene melting at 163–165° C.

What is claimed is:

1. Process for the manufacture of 10-unsubstituted 19-nor steroids, wherein $\Delta^4$-3-oxo-19-norsteroids selected from the group consisting of those of the spirostane, androstane, pregnane, cholane, cholestane, stigmastane and cardanolide series, containing in the 10-position an acyloxy group are treated with a metallic reducing agent, said metallic reducing agent being selected from the group consisting of Groups I and II of the Periodic System.

2. Process according to claim 1, wherein zinc is used as reducing agent.

3. Process according to claim 1, wherein the reduction is performed in a neutral medium.

4. Process according to claim 2, wherein the reduction is performed with zinc in a carboxylic acid anhydride.

5. Process according to claim 2, wherein the reduction is performed with zinc is a lower alkanol.

6. Process according to claim 2, wherein the reduction is performed with zinc in a lower alkane carboxylic acid.

7. Process for the manufacture of 10-unsubstituted 19-nor-steroids, wherein $\Delta^4$-3-oxo-19-norsteroids selected from the group consisting of those of the spirostane, androstane, pregnane, cholane, cholestane, stigmastane and cardanolide series containing in the 10-position an acyloxy group are treated with a heavy metal salt reducing agent.

8. Process according to claim 7, wherein cobalt (II) salts are used as reducing agent.

9. Process according to claim 7 wherein chromium (II) chloride in acetic acid solution is used.

10. Process according to claim 1, wherein $\Delta^4$-3-oxo-10-acyloxy-19-nor-androstenes are used as starting material.

11. Process according to claim 1, wherein $\Delta^4$-3-oxo-10-acyloxy-19-nor-pregnenes are used as starting material.

12. Process according to claim 1, wherein $\Delta^{4,6}$-3-oxo-10-acyloxy-19-nor-androstadienes are used as starting material.

13. Process according to claim 1, wherein $\Delta^{4,6}$-3-oxo-10-acyloxy-19-nor-pregnadienes are used as starting material.

14. Process according to claim 1, wherein a resulting $\Delta^{5(10)}$-3-oxo-19-norsteroid is converted into a $\Delta^4$-3-oxo-19-norsteroid by means of a member selected from the group consisting of an acidic agent and a basic agent.

15. Process according to claim 7, wherein $\Delta^4$-3-oxo-10-acyloxy-19-nor-androstenes are used as starting material.

16. Process according to claim 7, wherein $\Delta^4$-3-oxo-10-acyloxy-19-nor-pregnenes are used as starting material.

17. Process according to claim 7, wherein $\Delta^{4,6}$-3-oxo-10-acyloxy-19-nor-androstadienes are used as starting material.

18. Process according to claim 7, wherein $\Delta^{4,6}$-3-oxo-10-acyloxy-19-nor-pregnadienes are used as starting material.

19. Process according to claim 7, wherein a resulting $\Delta^{5(10)}$-3-oxo-19-norsteroid is converted into a $\Delta^4$-3-oxo-19-norsteroid by means of a member selected from the group consisting of an acidic agent and a basic agent.

No references cited.

LEWIS GOTTS, *Primary Examiner*.

UNITED STATES PATENT OFFICE
CERTIFICATE OF CORRECTION

Patent No. 3,211,760                      October 12, 1965

Oskar Jeger et al.

It is hereby certified that error appears in the above numbered patent requiring correction and that the said Letters Patent should read as corrected below.

Column 4, line 46, for "is", second occurrence, read -- in --.

Signed and sealed this 9th day of August 1966.

(SEAL)
Attest:

ERNEST W. SWIDER                      EDWARD J. BRENNER
Attesting Officer                        Commissioner of Patents